US008691092B2

(12) United States Patent
Streb

(10) Patent No.: US 8,691,092 B2
(45) Date of Patent: Apr. 8, 2014

(54) TREATING WATER USING FLOATING WETLAND MADE OF PLASTIC WASTE

(75) Inventor: Christopher A. Streb, Baltimore, MD (US)

(73) Assignee: Biohabitats Incorporated, Baltimore, MD (US)

(*) Notice: Subject to any disclaimer, the term of this patent is extended or adjusted under 35 U.S.C. 154(b) by 617 days.

(21) Appl. No.: 12/831,889

(22) Filed: Jul. 7, 2010

(65) Prior Publication Data

US 2012/0006743 A1    Jan. 12, 2012

(51) Int. Cl.
*C02F 3/32*    (2006.01)

(52) U.S. Cl.
USPC ....... 210/602; 210/615; 210/150; 210/170.05

(58) Field of Classification Search
USPC ............. 210/602, 615, 616, 150, 151, 170.05
See application file for complete search history.

(56) References Cited

U.S. PATENT DOCUMENTS

| 4,005,010 A | * | 1/1977 | Lunt | 210/615 |
| 4,415,454 A | * | 11/1983 | Fuchs | 210/616 |
| 4,576,718 A | * | 3/1986 | Reischl et al. | 210/616 |
| 5,337,516 A | * | 8/1994 | Hondulas | 47/65 |
| 5,676,836 A | * | 10/1997 | Yamasaki et al. | 210/602 |
| 5,799,440 A | * | 9/1998 | Ishikawa et al. | 47/65 |
| 6,383,373 B1 | * | 5/2002 | Nakao et al. | 210/151 |
| 7,160,445 B2 | * | 1/2007 | Sonnenberg | 210/167.31 |
| 7,314,562 B2 | * | 1/2008 | Svirklys et al. | 210/602 |
| 8,382,982 B2 | * | 2/2013 | Hondulas | 210/602 |
| 2002/0134728 A1 | * | 9/2002 | Festa et al. | 210/617 |
| 2004/0235970 A1 | * | 11/2004 | Smith et al. | 521/46.5 |
| 2005/0183331 A1 | * | 8/2005 | Kania et al. | 47/65.5 |
| 2006/0124540 A1 | * | 6/2006 | Austin et al. | 210/602 |
| 2009/0139927 A1 | * | 6/2009 | Kania et al. | 210/602 |
| 2011/0259820 A1 | * | 10/2011 | Songer et al. | 210/602 |

FOREIGN PATENT DOCUMENTS

| CN | 201178603 Y | * | 1/2009 |
| DE | 19654031 A1 | * | 6/1998 |
| JP | 2000-37144 A | * | 2/2000 |
| JP | 2003-10882 A | * | 1/2003 |
| JP | 2003-144000 A | * | 5/2003 |
| JP | 2003-145191 a | * | 5/2003 |
| JP | 2003-251315 A | * | 9/2003 |
| JP | 2005-313006 A | * | 11/2005 |
| JP | 2008-263787 A | * | 11/2008 |

* cited by examiner

*Primary Examiner* — Fred Prince
(74) *Attorney, Agent, or Firm* — Finnegan, Henderson, Farabow, Garrett & Dunner, LLP

(57) ABSTRACT

An apparatus for creating floating wetlands and improving water quality is provided. The apparatus includes a lower retainer; an upper retainer; a floatable waste material disposed between the lower retainer and the upper retainer; and an organic material planted between the lower retainer and the upper retainer; wherein the organic material is configured to denitrify the water source. A method of making a floating wetland device is also provided.

19 Claims, 4 Drawing Sheets

TREATING WATER USING FLOATING WETLAND MADE OF PLASTIC WASTE

I. FIELD OF THE DISCLOSURE

The present disclosure relates to apparatuses and methods for treating water, and more particularly, to treating bodies of water using floating wetland devices made from plastic waste.

II. BACKGROUND OF THE DISCLOSURE

Wetlands are examples of "ecotones," where land masses interface with water. Due to a variety of human impacts, a significant percentage of wetlands have been lost, along with the benefits they provide. Natural wetlands are often referred to as kidneys of the landscape. Due to their physical, chemical, and biological properties, wetlands serve as vital landscape features that improve water quality, provide habitat for a broad spectrum of fauna and flora, and provide ecosystem services that benefit humanity.

Until the last few decades, the importance of wetlands was not well understood. Since shipping has historically been a principle means of transportation and commerce, many wetlands were filled along tidal waters in cities to create ports. As human populations grew, the need for housing in urban areas increased, further displacing wetlands. In recent years, the continued march of urban development has resulted in extensive wetland loss.

Wetlands provide a natural buffer for waterways, filtering pollutants from surface waters. As human development and population has grown, so have the quantity of anthropogenic pollutants from stormwater runoff, failing sewage systems, and industrial discharges. Chemicals, nutrients, heavy metals, bacteria, sediment, and trash from these sources all impact water quality.

Both the loss of wetlands and the degradation of water quality by pollutants effect wetland ecosystems. Populations of fauna and flora that depend on these ecosystems have plummeted over recent decades, disrupting complex food webs. For example, increased nutrient loads cause massive blooms of algae leading to declines in dissolved oxygen in the water column. This can lead to fish kills and dead zones.

Wetlands provide a variety of services which are closely connected to human quality of life. Clean water is a fundamentally vital resource that supports all life. Human populations depend on fisheries for food and economic benefit. Many of these species sustaining these fisheries use wetlands for reproduction, feeding and shelter. Wetlands also attenuate flood events, protecting land, infrastructure and property from damaging storms, waves and floods. As sea levels continue to rise, wetlands will represent an important line of defense along coastal waterways.

Recently, there has been an increasing emphasis on the importance of wetlands and their contribution to improved water quality and ecosystem services. Efforts to use wetlands to improve water quality and habitat are often inhibited due to lack of suitable, undeveloped land. Moreover, sea level rise represents an unpredictable threat to coastal areas that limits efforts to create or restore wetlands.

The exemplary apparatuses and methods described in the present disclosure address one or more of the problems set forth above.

III. SUMMARY OF THE DISCLOSURE

In accordance with one disclosed exemplary embodiment, an apparatus for cleaning a water source is provided. The apparatus includes a lower retainer; an upper retainer; a floatable waste material disposed between the lower retainer and the upper retainer; and an organic material planted between the lower retainer and the upper retainer; wherein the organic material is configured to denitrify the water source.

In accordance with another disclosed exemplary embodiment, an apparatus for cleaning a water source is provided. The apparatus includes a lower retainer; an upper retainer; and a floatable waste material disposed between the lower retainer and the upper retainer; wherein at least some of the floatable waste material is retrieved from the water source in which the apparatus is to be installed.

In accordance with another disclosed exemplary embodiment, a method of making a floating wetland device is provided. The method includes retrieving plastic waste material from a water source; preparing the floatable waste material; enclosing the floatable waste material between a lower retainer and an upper retainer to create a floatable panel; planting seeds or plants in the floatable panel; and deploying the floatable panel in the water source.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

IV. BRIEF DESCRIPTION OF THE DRAWINGS

V. DETAILED DESCRIPTION OF THE DRAWINGS

In certain embodiments, the present disclosure is directed to floating wetland devices made from plastic waste. In one embodiment, plastic waste may include plastic bottles, such as commonly-used, consumer grade plastic bottles. Such floating wetland devices may be planted with wetland grasses, sedges, and forbs, and installed in any desired natural water source. Reference will now be made in detail to various embodiments of the present disclosure, certain examples of which are illustrated in the accompanying drawings.

Figure 1:
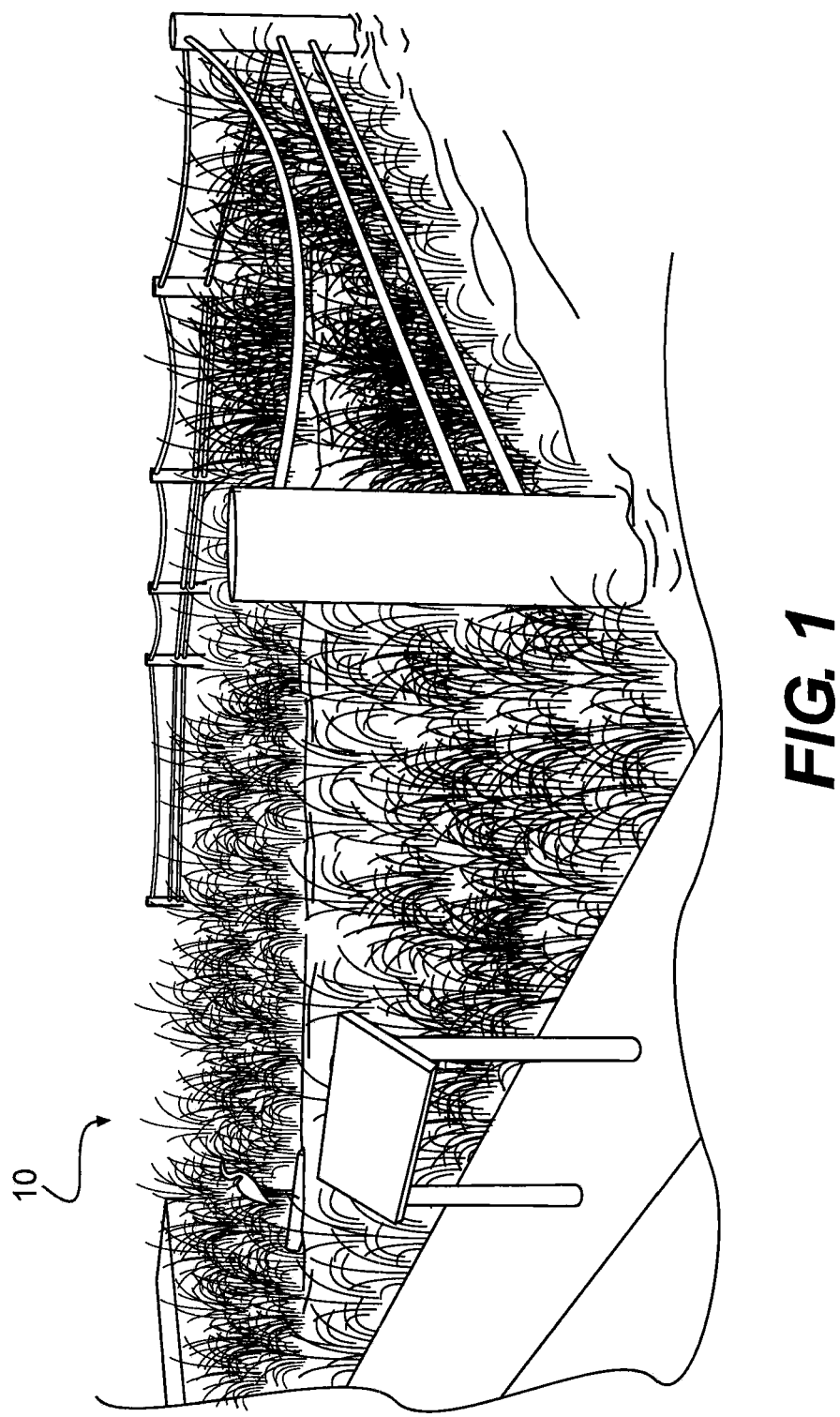
FIG. 1 depicts an exemplary environment in which floating wetlands may be implemented, consistent with aspects of the present disclosure.

FIG. 1 depicts an exemplary environment 10 in which floating wetlands may be desired. Environment 10 may be a pond, lake, creek, river, ocean, sea, harbor, marsh, or any other natural water environment. Environment 10 may also be a pool, reservoir, canal, or any other man-made water feature. Thus, it is contemplated that floating wetland devices consistent with the present disclosure may be installed in any type of natural or man-made water source. Although referred to as "water" in this disclosure, it will be appreciated that any liquid in which a floating wetland device may be placed may actually include a composite solution of fresh/salt water, gases, biological materials, pollutants, waste, etc.

Figure 2:
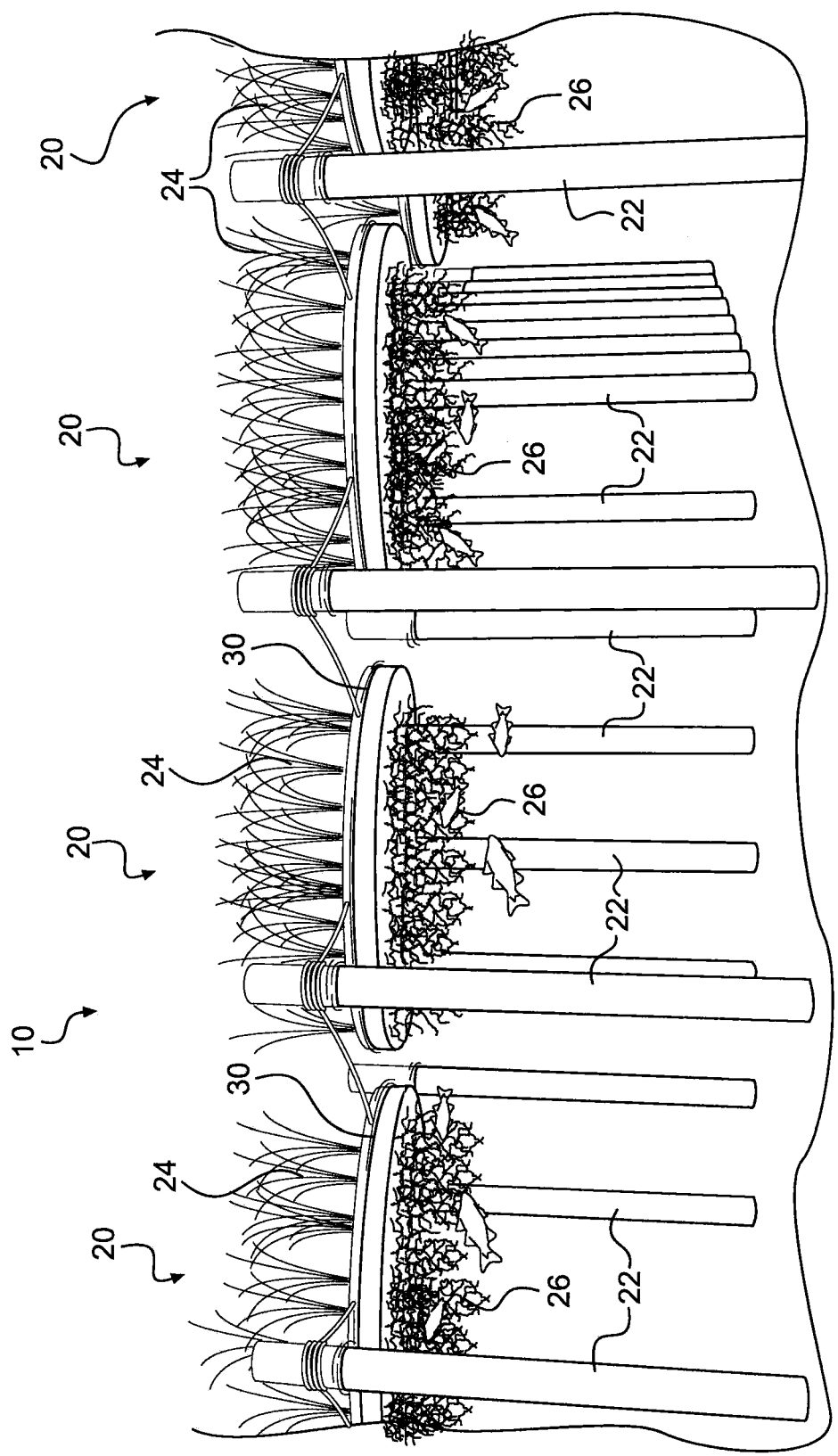
FIG. 2 depicts an underwater perspective view of exemplary floating wetland apparatuses consistent with aspects of the present disclosure.

FIG. 2 depicts an underwater perspective view of a plurality of floating wetland devices 20 installed in a wetland environment 10. In one embodiment, each floating wetland device 20 may include a floating panel 30 that floats on a surface of the water in which the floating wetland device 20 is disposed. Each floating panel 30 may include one or more organic plantings 24 having roots 26 extending below floating panel 30 into the water in which the floating wetland device is floating. Organic plantings 24 may include grasses, sedges, and forbs. In one embodiment, each floating wetland device 20 may be tethered to one or more supports 22, which are fixedly installed in a bed or basin below the water. Thus, floating wetland devices 20 may be positioned in strategic locations and held in place until it is desired to move them.

Figure 3:
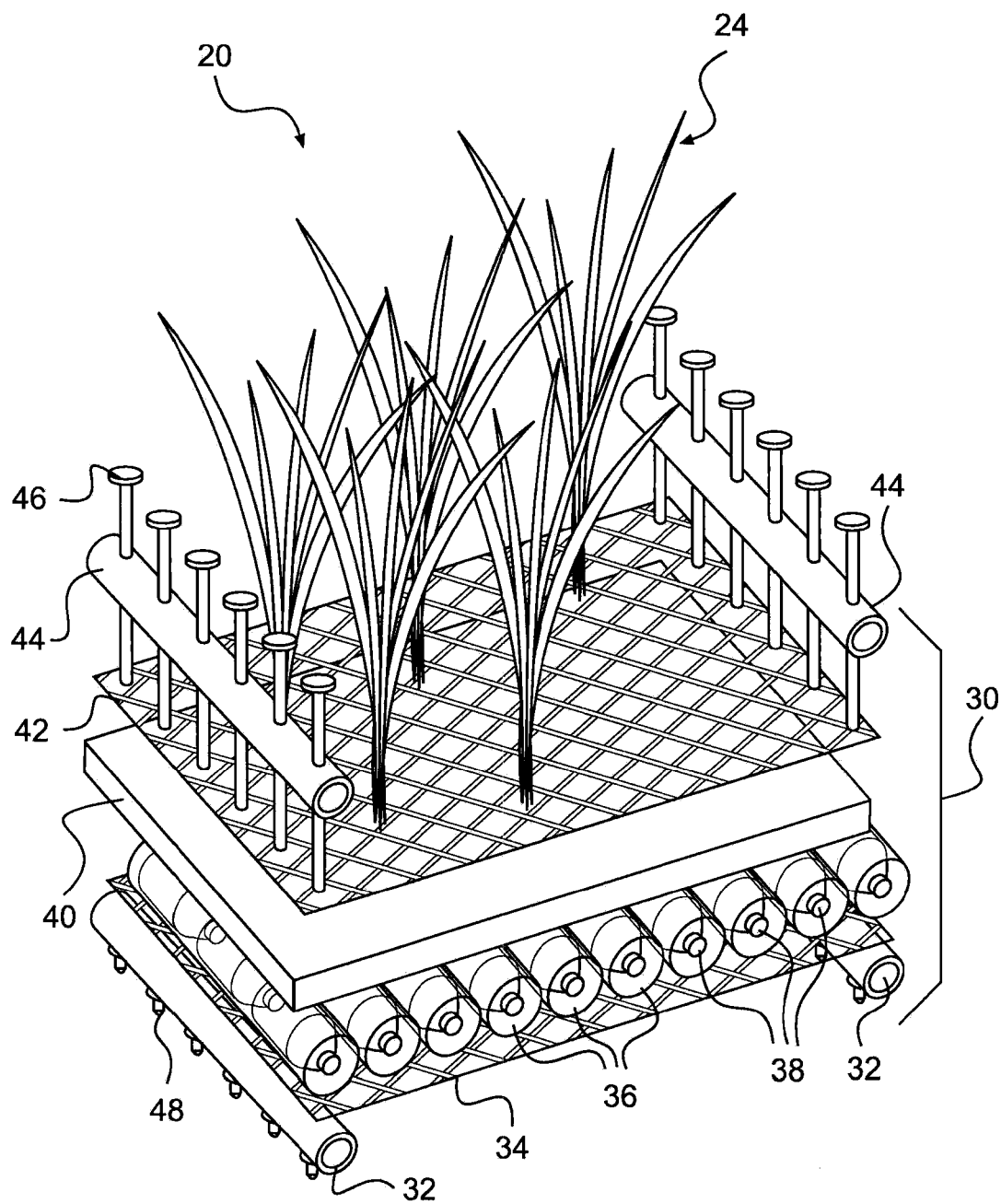
FIG. 3 depicts an exploded, sectional view of an exemplary floating wetland device consistent with embodiments of the present disclosure.

FIG. 3 depicts an exploded view of an exemplary floating wetland device 20, consistent with embodiments of the present disclosure. As described above, each floating wetland device 20 may include a floating panel 30. In one embodiment, each floating panel 30 may generally include a plurality layers disposed between lower tube edges 32 and upper tube edges 44. Lower tube edges 32 and/or upper tube edges 44 may constitute a relatively rigid structure by which the floating panel 30, and floating wetland device 20 generally, may be tethered to features of a water source or to other wetland devices. Lower tube edges 32 and/or upper tube edges 44 may be made from PVC pipe, wood, metal, polypropylene, or any other relatively rigid material that may float in water. In one embodiment, lower tube edges 32 and/or upper tube edges 44 may be made from recycled plastic materials. In one embodiment, upper tube edges 44 may be configured to support bird exclosure fencing, bird boxes, or any other wildlife refuge devices.

In one exemplary embodiment, floating panel 30 may include a floatable waste material 38 disposed between a lower retainer 34 and an upper retainer 42. In one embodiment, floatable waste material 38 may be secured in groups by a plurality of silt socks 36. Each floating panel 30 may further include a substrate panel 40 disposed between lower retainer 34 and an upper retainer 42. In one embodiment, substrate panel 40 may be disposed between floating waste material 38 and upper retainer 42. Thus, in one exemplary embodiment, floating panel 30 may include a lower retainer 34, floatable waste material 38 disposed in silt socks 36, a substrate panel 40, and an upper retainer 42, disposed in that sequence between lower tube edges 32 and upper tube edges 44. In one embodiment, floating panel 30 may include a plurality of fasteners 46, 48 configured to connect lower tube edges 32 and upper tube edges 44, thereby retaining lower retainer 34, floating waste material 38 in silt socks 36, substrate panel 40, and upper retainer 42 therein. Exemplary fasteners 46, 48 may include nuts 46 and bolts 48, UV-resistant wire ties, screws, or any other suitable fastening device.

Lower retainer 34 and/or upper retainer 42 may be made from any suitable material, such as commercially-available Geo-Grid, which is a polyester woven fabric, typically used for earth retention. Lower retainer 34 and/or upper retainer 42 may also or alternatively be made from polypropylene fencing, netting, mesh, or grid; polyethylene fencing, netting, mesh, or grid; geosynthetic reinforcements; and/or metal fencing. In one embodiment, lower retainer 34 and/or upper retainer 42 may be made from plastic waste materials and/or recycled plastic waste materials.

Floatable waste material 38 may be made from any suitable type of waste that is capable of floating. In one exemplary embodiment, floatable waste material 38 may include waste plastic bottles collected from the water source in which a floating wetland device is to be installed. In such an embodiment, the assembly of a floating wetland device 20 may have added advantages of removing physical waste from the water source before the floating wetland device 20 is even installed in the water source. Of course, the floatable waste material 38 may include any other type of plastic waste, such as plastic bags, plastic containers, Styrofoam cups or packaging, or any other type of plastic waste. In addition, silt socks 36 may also or alternatively include mesh fabric tubes, or any other component for containing floatable waste material 38 in manageable groups.

Substrate panel 40 may be any suitable type of high-surface area substrate for supporting the development of bio-film. For example, substrate panel 40 may be made from commercially-available Epi-web or eco-web materials, which may include non-toxic, mostly recycled plastic material structures designed for having seeds or plants planted therein, and for promoting root growth and nutrient uptake. Alternatively or additionally, substrate panel 40 may be made from one or more of a non-woven polypropylene matting, coir fiber matting, coir fiber pillows, organic plant cellulose (e.g., reed, bamboo, straw, etc.), or wood charcoal.

In one embodiment, wetland device 20 may be provided with an aeration device that introduces additional air, including more oxygen, into the water. For example, wetland device 20 may be provided with a pump that delivers air or oxygen into the water, or another device that creates turbulence or water droplets, with the effect being increased oxygen content in the water.

Figure 4:
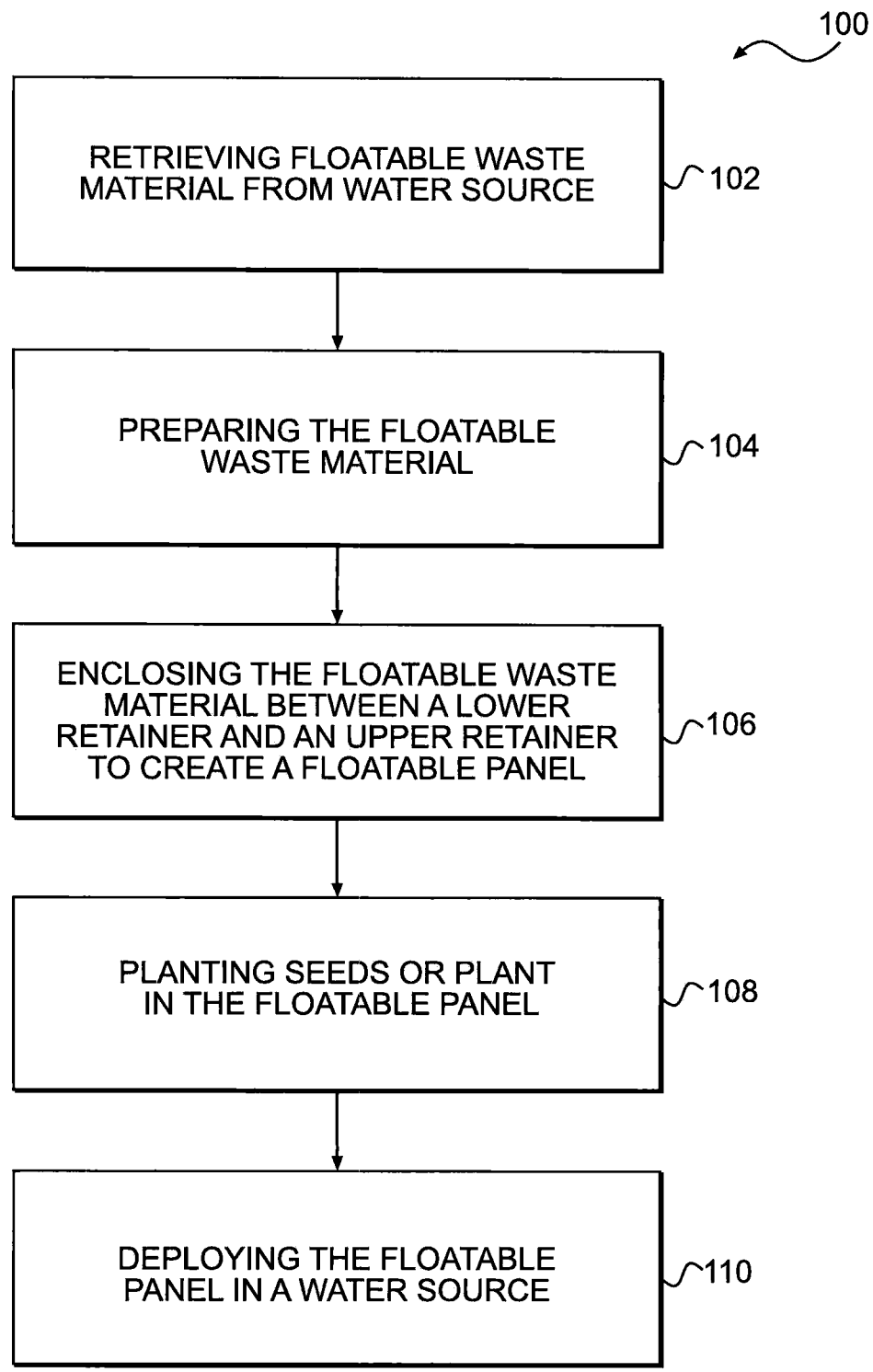
FIG. 4 depicts a flowchart of an exemplary method of making a floating wetland apparatus consistent with the present disclosure.

FIG. 4 depicts an exemplary method 100 for making a floating wetland device consistent with the present disclosure. Method 100 may include retrieving floatable waste material from a water source (step 102). For example, method 100 may include retrieving waste plastic materials, such as plastic bottles and trash, from a wetland, lake, or bay. Method 100 may also include preparing the floatable waste material (step 104). For example, method 100 may include removing labels from any plastic bottles, removing any liquid from inside the plastic bottles, and sealing the plastic bottles with bottle caps or otherwise, to prevent water from entering the bottles, thereby improving their buoyancy. Method 100 may further include enclosing the floatable waste material between a lower retainer and an upper retainer to create a floatable panel (step 106). For example, Geo-Grid or any other retaining netting may be used to sandwich or wrap around the floatable waste material, thereby creating a cohesive unit. In one embodiment, method 100 may further include disposing the floatable waste material within one or more silt socks. Method 100 may also include disposing a planting substrate between the floatable waste material and the upper retainer. Method 100 may further include planting seeds or plants in the floatable panel (step 108). Finally, method 100 may include deploying the floatable panel in a water source (step 110).

The floating wetland device 20 and methods disclosed herein may advantageously revitalize polluted water sources by aggregating loose plastic waste from the water source into floating panels, and using plant life in the floating panels to uptake pollutants, increase denitrification, potentially reintroduce oxygen into the water source, and create conditions suitable for beneficial bacteria that feed on pollutants.

For example, by collecting loose plastic waste within retainers or netting, the visual appearance of a water source may be improved, and the likelihood of waste interfering with wildlife or their habitats may be decreased. Because roots may be suspended into the water column, nutrient overloads may be mitigated by plant uptake, and aquatic organisms may be provided with increased shelter habitats and food.

In addition, the introduction of new plant life and root systems into various locations of the water may increase denitrification of the water. Denitrification is a microbial process of converting $NO^3$ into N gases, which improves wetland biogeochemistry and water quality, e.g., by removing excess nitrates from the water. For example, wetlands consistent with the present disclosure may increase plant life that results in oxygenated zones around the plants' roots. When wetland plants pull oxygen into their roots, they may create areas around the root zone having higher oxygen concentrations surrounded by lower oxygen concentrations, which creates conditions suitable for denitrification. Thus, wetlands may reduce nitrates and therefore mitigate the algae blooms and resulting flora/fauna die-offs common in polluted water sources.

Finally, the disclosed floating wetland device and methods may assist with educating the public about the benefits of wetlands and importance of water quality. The device may inspire average people to modify their behavior to reduce water pollution by demonstrating a connection that disposing pollution on land pollutes receiving waters. Thus, readers of the present disclosure may now be aware of the importance of wetlands, and they may be able to create such a floating wetland device, and deploy the device in natural and manmade water sources in virtually any location around the country, so as to favorably treat water sources and improve the environment.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. An apparatus for treating a water source, the apparatus comprising:
   a lower retainer;
   an upper retainer;
   floatable waste material disposed between the lower retainer and the upper retainer, at least some of the floatable waste material including waste recycled from an environment in which the apparatus is to be installed; and
   an organic material planted in or between the lower retainer and the upper retainer;
   wherein the organic material is configured to denitrify the water source.

2. The apparatus of claim 1, wherein one of the lower retainer and upper retainer is made from one or more of: geo-grid, geosynthetic reinforcements, metal fencing, and polytheylene or polypropylene fencing, netting, mesh, or grid.

3. The apparatus of claim 1, further comprising a substrate disposed between the lower retainer and the upper retainer, wherein the substrate provides a surface on which the organic material grows.

4. The apparatus of claim 3, wherein the substrate is disposed between the floatable waste material and the upper retainer.

5. The apparatus of claim 3, wherein the substrate is made from one or more of: epi-web, eco-web, non-woven polypropylene matting, coir fiber matting, organic plant cellulose, or wood charcoal.

6. The apparatus of claim 1, wherein the floatable waste material includes plastic bottles.

7. The apparatus of claim 1, wherein the floatable waste material is disposed in a plurality of silt socks disposed between the lower retainer and the upper retainer.

8. The apparatus of claim 1, wherein the lower retainer is fixed to the upper retainer around an outer periphery.

9. An apparatus for cleaning a water source, the apparatus comprising:
   a lower retainer;
   an upper retainer; and
   floatable waste material disposed between the lower retainer and the upper retainer;
   wherein at least some of the floatable waste material is retrieved from the water source in which the apparatus is to be installed.

10. The apparatus of claim 9, wherein one of the lower retainer and upper retainer is made from one or more of: geo-grid, geosynthetic reinforcements, metal fencing, and polytheylene or polypropylene fencing, netting, mesh, or grid.

11. The apparatus of claim 9, further comprising a substrate disposed between the floatable waste material and the upper retainer, wherein the substrate provides a surface on which the organic material grows.

12. The apparatus of claim 11, wherein the substrate is made from one or more of: epi-web, eco-web, non-woven polypropylene matting, coil fiber matting, organic plant cellulose, or wood charcoal.

13. The apparatus of claim 9, wherein the floatable waste material includes plastic bottles.

14. The apparatus of claim 9, wherein the lower retainer is fixed to the upper retainer around an outer periphery.

15. The apparatus of claim 9, wherein the floatable waste material is disposed in a plurality of silt socks disposed between the lower retainer and the upper retainer.

16. A method of making a floating wetland device, the method comprising:
   retrieving plastic waste material from a water source in which the floating wetland device is to be installed;
   preparing the floatable waste material;
   enclosing the floatable waste material between a lower retainer and an upper retainer to create a floatable panel;
   planting seeds or plants in the floatable panel; and
   deploying the floatable panel in the water source.

17. The method of claim 16, wherein preparing the floatable waste material includes removing at least some water content from the floatable waste material.

18. The method of claim 16, further comprising disposing a substrate between the floatable waste material and the upper retainer.

19. The method of claim 16, further comprising fastening the lower retainer to the upper retainer at portions disposed around a periphery of the floatable panel.

\* \* \* \* \*